(12) United States Patent
Rafii

(10) Patent No.: US 10,997,970 B1
(45) Date of Patent: May 4, 2021

(54) METHODS AND SYSTEMS IMPLEMENTING LANGUAGE-TRAINABLE COMPUTER-ASSISTED HEARING AIDS

(71) Applicant: Abbas Rafii, Palo Alto, CA (US)

(72) Inventor: Abbas Rafii, Palo Alto, CA (US)

( * ) Notice: Subject to any disclaimer, the term of this patent is extended or adjusted under 35 U.S.C. 154(b) by 0 days.

(21) Appl. No.: 16/947,269

(22) Filed: Jul. 27, 2020

Related U.S. Application Data

(60) Provisional application No. 62/880,502, filed on Jul. 30, 2019.

(51) Int. Cl.
*G10L 15/06* (2013.01)

(52) U.S. Cl.
CPC .................... *G10L 15/063* (2013.01)

(58) Field of Classification Search
CPC ....... G10L 15/063; G10L 15/06; G10L 15/00; G10L 2015/0631; G10L 15/07; G10L 15/075; G10L 15/005; G10L 17/04
See application file for complete search history.

(56) References Cited

U.S. PATENT DOCUMENTS

| | | | | |
|---|---|---|---|---|
| 5,813,862 | A * | 9/1998 | Merzenich | G09B 5/065 434/185 |
| 7,676,372 | B1 * | 3/2010 | Oba | G10L 21/0364 704/271 |
| 8,781,836 | B2 * | 7/2014 | Foo | H04R 25/505 704/269 |
| 10,791,404 | B1 * | 9/2020 | Lasky | H04R 25/30 |
| 2015/0127349 | A1 * | 5/2015 | Agiomyrgiannakis | G10L 13/02 704/266 |
| 2018/0125415 | A1 * | 5/2018 | Reed | H04R 25/30 |

* cited by examiner

*Primary Examiner* — Fan S Tsang
*Assistant Examiner* — David Siegel

(57) ABSTRACT

A hearing aid system presents a hearing impaired user with customized enhanced intelligibility sound in a preferred language. The system includes a model trained with a set of source speech data representing sampling from a speech population relevant to the user. The model is also trained with a set of corresponding alternative articulation of source data, pre-defined or algorithmically constructed during an interactive session with the user. The model creates a set of selected target speech training data from the set of alternative articulation data that is preferred by the user as being satisfactorily intelligible and clear. The system includes a machine learning model, trained to shift incoming source speech data to a preferred variant of the target data that the hearing aid system presents to the user.

25 Claims, 7 Drawing Sheets

METHODS AND SYSTEMS IMPLEMENTING LANGUAGE-TRAINABLE COMPUTER-ASSISTED HEARING AIDS

PRIORITY CLAIM

Priority is claimed from applicants' U.S. Provisional patent application entitled Trainable Computer Assisted Hearing Aid, filed 30 Jul. 2019, provisional application Ser. No. 62/880,502. Applicant incorporates said provisional patent application by reference herein.

FIELD OF THE INVENTION

The invention relates to providing a hearing aid for hearing impaired users, and to methods to better tailor the hearing aid to the specific hearing impairments of the users to yield speech having enhanced intelligibility in a language preferred by a user.

BACKGROUND OF THE INVENTION

As the world population ages, hearing loss among the elderly becomes a more serious problem. For example, over half the US population older than 65 years' experiences a form of hearing loss. The rate of people experiencing hearing problems is also surpassing the population growth rate. Looking forward, it is projected that the number of hearing impaired Americans will exceed 40 million by 2025; see www.Hear-it.org. However, fewer than perhaps 25% to 28% of those who need a hearing aid device actually use one; see https://www.ncbi.nlm.nih.gov/pmc/articles/PMC6328256/. The projected market for hearing aid devices is estimated to be worth $9.78 Billion by 2022; see https://www.marketsandmarkets.com/PressReleases/hearing-aids.asp Overall it is apparent that current solutions for hearing loss do not completely address the problem, and that more innovative solutions for improving the hearing quality of patients are needed, Two main medical categories of hearing loss are conductive hearing loss and sensorineural hearing loss. Conductive hearing loss is a middle ear disease that reduces the oscillation ability of middle ear bones to capture and thus conduct sound signals to the brain. Sensorineural loss concerns problems with the inner ear sensing (in the cochlea), and can be caused by many factors ranging from illness, continuous loud sound, familial inherited conditions, to old age.

A person with a hearing loss typically is unable to hear soft sounds. The most debilitating symptom is that words as heard by the listener are muffled, even at a loud level. That is, even if the person hears the speech, he or she may have difficulty in discerning the words as being able to hear a speech and to discern what is being said are two different things. A hearing loss condition interferes with a person's ability to completely recognize conversational speech in daily life venues, in noisy environments, while watching TV, etc.

Audiologists measure a patient's hearing ability by testing whether they hear a beep sound at different intensity levels and different frequencies. The measured results can be shown on an audiogram, which is a graph-like map of the patient's hearing spectrum. The graph x-axis is test beep frequency, and the y-axis is the sound level (or signal strength) in dB. Horizontal bands in the graph indicate hearing loss deviation from an optimal level. For instance, a patient's hearing a 1000 Hz sound at 50 dB level may indicate a moderate hearing loss at mid-frequency. Hearing loss usually occurs at higher frequencies but can vary by patient. Such audiology testing results can be used in designing prior art hearing aids to try to improve the patient's hearing deficiencies. A patient may have a hearing deficit in one ear or in both ears, but the deficit in each ear may differ. Thus as used herein, the term "ear" may include the term "ear(s)" in referring to use of a hearing aid in improving a patient's hearing deficit.

Prior art hearing aids that try to compensate for a patient's (or user's) hearing response primarily address sound intensity issued. Such hearing aids may amplify the frequencies at which a patient has trouble hearing, while perhaps suppressing other frequencies to equalize the sound for the user. These prior art hearing aids seek to effectively produce an output signal into the patient's ear that will assist the ear in conducting a balanced signal to the patient's brain neural system. More complex prior art hearing aids may detect and cancel ambient sounds to produce an output signal into the patient ears. But often certain ambient sounds, e.g., the cracking of a plastic bottle or the rolling of a cart, may create disturbing and loud sound effects that are output into the ear of a the hearing aid user.

One known method of reducing ambient noise is the use of a directional microphone, which captures sound best in the microphone detection region, while suppressing sound, including noise and speech, emanating from other regions. A more sophisticated prior art method of ambient noise reduction is the use of digital noise reduction (DNR) to process microphone (directional or omni-directional) detected sounds, which may include speech, noise, etc., The microphone detected sound signals are processed using algorithms that classify incoming detected sounds, and selectively suppress or enhance signals based on such classification. See for example "Optimizing Noise Reduction Using Directional Speech Enhancement", http://www.hearingreview.com/2013/02/optimizing-noise-reduction-using-directional-speech-enhancement/.

In recent years, machine learning (ML) and deep learning (DL) methods (see for example Goodfellow, Y. et al., "Deep Learning," MIT Press, 2016) have been used in attempts to improve the performance of hearing devices. See for example or https://www.ncbi.nlm.nih.gov/pmc/articles/PMC6328256/. An important aspect of a successful ML approach is the quality and abundance of input training data, and the capacity of the model for generalized learning. As a classification exercise, ML has been used to separate speech from background sounds or to segregate different sounds (e.g., car noise vs speech), or recognizing the speaker's voice. Signia research in 2017 purports to use ML methods to enable a hearing aid user to hear a more natural-sounding version of their own voice; see https://www.signia-hearing.com/blog/machine-earning-in-hearing-aids/.

Other potentially applicable methods that may be useful in improving hearing aids exist. For example, Google®'s Parrotron (https://ai.googleblog.com/2019/07/parrotron-new-research-into-improving.html) artificial intelligence tool consists of a single end-to-end deep neural network trained to convert speech from a speaker with atypical speech patterns directly into fluent synthesized speech. Another relevant approach may be speech cloning, where the field of speech processing includes speech conversion as suggested by Qian in 2019 (See https://arxiv.org/pdf/1905.05879.pdf.)

As applied to hearing aids, while these prior methods primarily try to address the problem of improving frequency response as needed, they do not address the more significant problem of enabling the listener to better discern the language of speech or the spoken words. People with hearing loss may try to fill in spoken words from the context of the conversation, although this approach is not always successful. For example, relying upon context may fail in examples as common as questioned asked at a registration desk, the question "What is your phone number?" and the question "What is your full name?" may not readily be distinguishable.

Successfully perceiving natural (human) speech is also governed by cognitive faculties present in the human brain. The cognitive aspects of hearing characterize sound from many factors, including voice pitch, voice timbre, pronunciation, choice of words, emphasis and timing of syllables, talking rhythm, etc.

What is needed is a method and system to provide clearer and more intelligible language of speech to a hearing impaired person. Such method and system preferably should be trainable not only in response to the particulars of the impaired person's sensorineural aspects, but also in response to the person's brain auditory processing and language interpretation. Preferably, such training should be customizable to the person, while taking advantage of data from categories of population with similar internal hearing processing, perhaps other elderly women if the person is an elderly female, or people with similar linguistic background. Like advanced language translation that seeks to enable translation from one language domain to another, a preferred hearing aid methodology and system preferably should perform real-time transformation (or conversion) from a first speech domain to a second speech domain that is substantially tailored to an individual person's end-to-end language audio processing.

The present invention provides such hearing aid methodology and system.

SUMMARY OF THE PRESENT INVENTION

The present invention provides a hearing aid and design methodology with improved processing in the speech frequency spectrum and language content to more intelligently enhance output speech quality commensurate with the hearing abilities of a given user with hearing impairment.

Embodiments of the present invention provide customizable methods and systems to evaluate hearing impairment for a user, to address language hearing of the user's hearing impairment. This acquired evaluation data is then used to develop a preferably computer assisted hearing method and system to compensate for the user's evaluated hearing impairment. More specifically, embodiments of the present invention are directed to improving the user's understanding or intelligibility of spoken words, referred to herein as speech, or as linguistic content. While methodology according to embodiments of the present invention embeds language learning in the solution for best hearing results, the solution method is substantially language independent. The method includes processes for training machine learning models with data obtained from individual users, and optionally augmented from relevant data from a wider user population, e.g., including users of similar demographic, geographic hearing impairment and linguistic background. Embodiments of the present invention learn particulars of the sensorineural aspects of the user's hearing, but also strive to model the user's entire hearing pipeline, which also includes the brain's auditory language processing and interpretation.

According to embodiments of the present invention, the user undergoes a training session and responds to clarity of input speech sounds. By contrast prior art testing simply asks the user to respond to input audio signals having different frequencies. Thus in a hearing aid prior art the sound of letter 's', perhaps since it has a high frequency content, may be magnified in any context, whereas an embodiment of the present invention may only magnify it in words like 'street' and 'strong' but not necessarily in words like 'sensor' and 'century.' Advantageously a hearing aid system according to embodiments of the present invention learns not only the particulars of the sensorineural aspects of the user's hearing, but also learns the user's entire hearing pipeline, which also, as mentioned, includes the brain's auditory language processing and interpretation.

Thus, a preferred method of the present invention may be said to process an input speech signal having a first speech articulation so as to generate therefrom for a hearing impaired listener (listener) an enhanced intelligibility output speech signal. Preferably input samples are created from the first speech articulation distribution. For each input sample, alternative articulations are presented to the listener during an interactive session. During this interactive session the listener can hear at an appropriate sound level these alternative articulations. For each input sample at least a sample from the alternative articulations is selected that includes an enhanced intelligibility sound preferred by the listener, such that a plurality of preferred articulations is created. This created plurality is designated as the second speech articulation distribution data for the listener. Preferably a labeled dataset of corresponding pairs from the first and second speech articulation distributions is created. This labeled data set is used to train a speech articulation transformation model such that when trained, if the model is given an input from the first articulation distribution, it generates in real time an enhanced intelligibility output from the second articulation distribution. In this fashion the listener can hear in real time a more intelligible version of the input speech signal than if such methodology were not used.

A hearing aid system according to embodiments of the present invention may be described as follows. The hearing aid system processes an input speech signal having a first speech articulation distribution, and generates therefrom for a hearing impaired listener (listener) an enhanced intelligibility output speech signal from a second speech articulation distribution. The hearing aid system includes a processor system with CPU, memory, and software routines (routine(s)) stored in the memory and executable by the CPU to carry out operations of the hearing aid system. A first routine preferably creates input samples from the first speech articulation distribution, and for each input sample presents alternative articulations to the listener during an interactive session. During this session, a second routine enables the listener to hear, at an appropriate sound level for the user, the alternative articulations for each input sample. A third routine selects for each input sample at least a sample from the alternative articulations that includes an enhanced intelligibility sound preferred by the listener. In this fashion a plurality of listener preferred articulations is created. A fourth routine designates this plurality of preferred articulations as the second speech articulation distribution data, and a fifth routine creates a labeled dataset of corresponding pairs from the first and second speech articulation distributions. A sixth routine forms and trains a speech articulation transformation model from the labeled dataset. When trained, if the model is given an input from the first articulation distribution, the model generates in real time an enhanced intelligibility output from the second articulation distribution. In this fashion the hearing aid system enables the listener to hear in real time a more intelligible version of the input speech signal than if the hearing aid system were not used.

Without loss of generality, the present invention is especially applicable for users with hearing impairments, but similar methodologies as described herein can also be applied for improving language hearing of users with normal hearing (i.e., with di minimis magnitude of hearing impairment).

Other features and advantages of the invention will appear from the following description in which the preferred embodiments have been set forth in detail, in conjunction with their accompanying drawings.

DETAILED DESCRIPTION OF THE PREFERRED EMBODIMENTS

As noted, embodiments of the present invention provide analytical methods and tools to implement a hearing aid device tailored to the speech hearing ability of a specific listener or user of the hearing aid. As used herein, the terms "voice data", "speech" and "audio data" may be used interchangeably as relates to the understanding of spoken words by a listener. Unless noted otherwise, the terms "understanding" or "intelligibility" or "clearer" may be used interchangeably herein with reference to improving a user's ability to discern and preferably understand the meaning of speech. Unless explicitly noted or clear from the context, the words "translating", "transforming", "shifting", or "cleaning up" may be used interchangeably to denote changing speech from a first form to a second form that is more intelligible to the listener. The words "generate" or "synthesize" also may be used interchangeably to denote the voice sound created by such transformation. Additionally, in different contexts, spoken speech may have constituents such as sentences, words, letters, syllables, phonemes, etc. The terms "enunciation", "articulation" and even "pronunciation" may be used interchangeably as they affect the intelligibility of language by a listener. The terms "speech contents", "language contents", "voice contents" or "linguistic contents" may be used interchangeably and meant to be the transcription of speech. The terms "acoustic features", "vocal qualities", and "utterances" may be used interchangeably. Further, the terms "listener" and "user" may be used interchangeably in reference to a hearing impaired person intended to be aided by embodiments of the present invention.

Figure 1A:
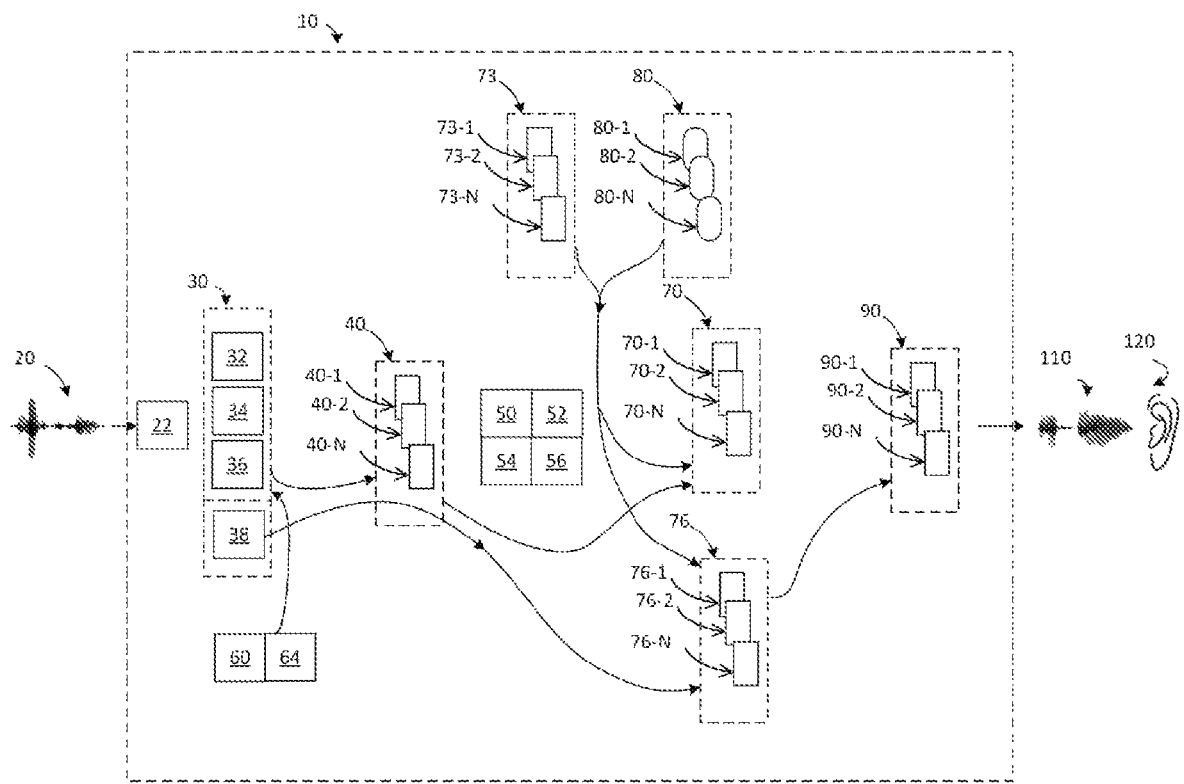
FIG. 1A is a block diagram of a hearing aid system, according to embodiments of the present invention.

FIG. 1A depicts a hearing aid system 10 according to embodiments of the present invention. Hearing aid system 10 receives input sound or speech 20 from an input transducer 22, perhaps a microphone, and signal processes at least segments of this input sound to produce an output sound signal 110 that preferably is heard better and more intelligibly, not necessarily more loudly, by user 120 than original input sound 20 would be heard. The entire process is preferably implemented with minimum latency as to be practical for a real-time application. As described further herein, a preferred algorithm designed to ensure task completion within a time deadline is used to preclude user 120 from hearing double speech that is from hearing a first version of output speech 110 followed almost immediately by a delayed version of the output speech.

In the field of speech modeling, including language translation, common practice is to convert the speech, represented as a continuous time series, to text, and perform the transformation in the text domain, and finally convert the transformed output text-to-speech (TTS). Embodiments of the present invention recognize the benefits of staying within the time domain for speech transformation, particularly as applied to embodiments in which adjustment to speech is substantially localized. Stated differently, while for instance in a language translation application, the speech-to-speech (STS) transformation requires mapping perhaps a long sequence of input to another long sequence of output, embodiments of the present invention may apply to very brief input/output sequences, say, at syllable granularity. In another embodiment of the present invention, the transformation model inputs the entire vocal qualities of speech (namely, pitch, rhythm and timbre) in the form of a time series. Next the speech is encoded to a set of latent states, and then decoded from these latent states directly to the target output speech. Such use of time domain speech transformation are further depicted and described with reference to FIG. 1A, FIG. 1B, and FIG. 1C.

The components comprising system 10 in FIG. 1A will now be described to better understand preferred methods of learning signal processing. During such signal processing, input speech 20 from a first distribution is transformed to a second more intelligible output distribution 110, preferably by collecting and processing a relevant body of data. In FIG. 1A input audio 20 is detected by transducer 22 and preferably is coupled to module block 30, which is a stored source of audio from the user and augmented by a relatively large speaker population that preferably shares at least some demographic, linguistic or hearing relevance to user 120. Exemplary relevance may include without limitation similar age and/or sex to user 120, similar accent (if any), similar mode of speaking, etc. Module block 32 refers to the population data and module block 34 represents a stored source of custom audio data obtained from the specific user 120. Thus module block 32 and module block 34 represent a continuum from most general to most specialized sources of audio data. As applications for the present invention spread, eventually there will be sufficient adequate accumulated categorical audio data to minimize the need to collect substantial custom data from each individual user leading to accelerated data collection methods. In other words, after collecting a few indicator data from a user, that user can be reasonably confidently placed in an optimal known category for which substantial data already exists. In FIG. 1A, module block 36 represents stored customary test data to validate system 10 signal processing performance. Module block 38 represents transducer 22 input data detected during the normal run time operation of system 10. The normal operation of system 10 may also be referred to as inference mode.

Module blocks 60 and 64 in FIG. 1A represent, respectively, data collection tools and labeling tools, which will be further described later with respect to FIG. 4A.

System 10 preferably includes at least one processor unit 50, a CPU 54 to perform the steps of the signal processing, an optional wireline or a wireless communication unit 52, and a memory 70 to store the volatile and persistent states of the processing system. For example any or all data in module blocks 32, 34, 38 may be stored in a portion of memory 56. Not shown in FIG. 1A for ease of illustration is a source of operating power for system 10, typically a battery.

Module block 40 in FIG. 1A encompasses different representations of the input data for the learning signal processing of system 10, e.g., representations 40-1, 40-2, . . . 40-N. (As used in the various figure drawings herein, N indicates a plurality but the exact magnitude of N may be different, e.g., for 73-N, or 80-N etc. in FIG. 1A, Thus, N indicates a plurality.) The different representations are described later herein and preferably include at least short-term Fast Fourier Transform (FFT), Mel-spectrum, log Mel-spectrum, MFCC, Relative Spectral Transform-Perceptual Linear Prediction (RASTA-PLP), Linear Predictive Coding (LPC).

Module blocks 70, 76, and 80 in FIG. 1A represent training machine learning signal processing, inference processing and combined learning parameters and hyper parameters of system 10, correspondingly. Module block 73 refers to the loss function and optimization functions that govern the learning process of module 70. These components are further described in the rest of the application.

Module block 90 in FIG. 1A represents the reverse transformation from an internal representation of data to a more intelligible and enhanced audio out signal 110. Different forms of the reverse transformations. e.g., modules 90-1, 90-2, . . . 90-N, may include without limitation inverse FFT, Griffin-Lim Algorithm (GLA), and fast GLA.

The flow arrows in FIG. 1A depict a general flow of data or control among the modules of system 10. For instance, the audio data 30 that is used for training is collected by data collection and labeling tools 60 and 64. The training data flows to module 40, and then to training module block 70. The loss function and parameters blocks 73 and 80, respectively, guide the learning process of module block 70. The run-time audio data 38, after conversion to internal representation 40 feeds the inference engine 76. The output of the inference module block 76 is synthesized to clear speech 110 by algorithms of module block 90.

An exemplary description of overall signal processing functions in system 10 that use at least segments of input sound 20 to produce an output sound signal 110 that preferably is heard better and more intelligibly, not necessarily more loudly, by user 120 than original input sound 20 would be heard will now be given. Consider a functional expression y.

The term voice shifting may be described as the functional transformation of an input audio x to an output audio y by a learning function $f$ with parameters $\theta$ and $\omega$ as expressed in equation (1) below:

$$y=f(x;\theta,\omega) \quad (1)$$

Input audio x is sound that is produced in the real world by people or reproduced in an electrical form such as a loud speaker. Without loss of generality, the present description will focus on the case where the origin of the sound is in the form of human spoken words. Although other similar embodiments could be designed for other sound types.

In equation (1) parameters $\theta$ and $\omega$ encapsulate respectively a set of parameters (trainable), and a set of hyper-parameters (substantially pre-defined), in a multi-dimensional space.

The transformation function $f$ in equation (1) may be a composition of perhaps simpler functions that define a learnable machine learning (ML) network. In the literature, the most successful learning networks are called deep neural networks (DNN) and convolutional neural networks (CNN), which is a common form of a DNN.

The parameters $\theta$ and $\omega$ in equation (1) may thus be treated as the values (or weights) where $\theta$ is learned by a DNN and $\omega$ controls the learning process. These parameters are collectively represented in FIG. 1A by module block 80, and preferably are integral parts of learning signal processing software modules 70 and learned inference module 76 in FIG. 1A.

Figure 1B:
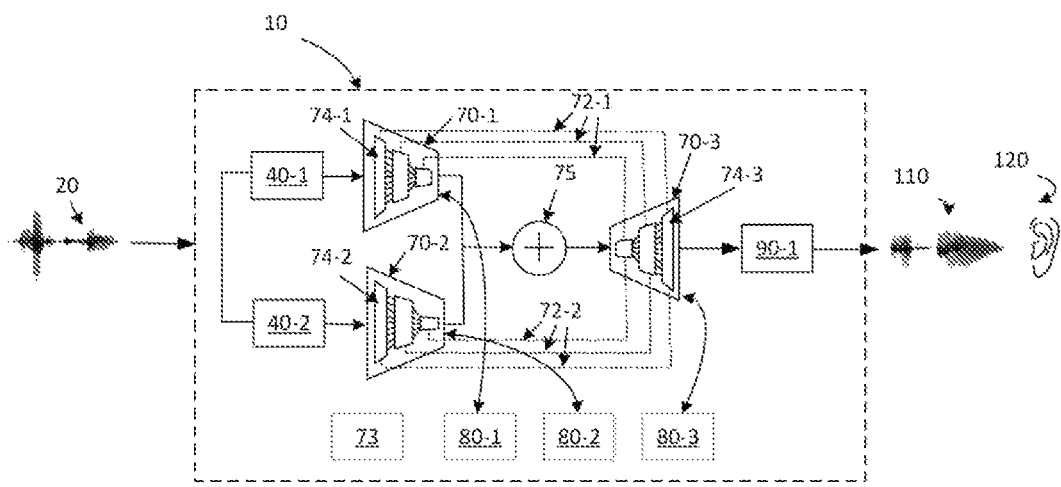
FIG. 1B is a block diagram depicting signal flow in an exemplary machine learning module, according to embodiments of the present invention.

FIG. 1B is an expanded depiction showing signal flow for a preferred embodiment of the present application. The following representations are useful in understanding FIG. 1B. Let e( ) be a functional representation of the end-to-end auditory processing of user 120. Referring to input audio 20 (see FIG. 1A or FIG. 1B) for a given speech segment input x, then ý=e(x) is what this user, e.g., user 120, hears, which heard sound is presumably not very intelligibly clear to the user. In a preferred embodiment of the present invention, $f( )$ is a function that when given an input x, the function synthesizes an output such that y=e($f$(x)) is a clearer, more intelligible version of x as heard by the user. Embodiments of the present invention recognize that what is then needed is a method to train $f( )$ that is customizable to the auditory processing of the specific listener. The end result preferably is a hearing aid such as system 10, customized to the impairments of each ear of the use.

Machine learning (ML) is a practice in the general field of artificial intelligence (AI).

Elements of machine learning methods used by preferred embodiments of the present invention will now be described, including further reference to module blocks in FIG. 1A an FIG. 1B. The elements of a machine learning solution preferably include (a) a parametric learning model or network (e.g., module block 70), (b) a set of training data (e.g., module blocks 32, 34, and 36), (c) an objective function (also called a loss function) (e.g., module block 73), and (d) a mathematical guideline to minimize the loss function (e.g., also in module block 73).

Consider now a preferred implementation of a machine learning model, which may be considered to be a function intended to map its input to a desired correct output. The mapping preferably is guided by parameters that are essentially learned by a relatively large number of examples.

Once the model is properly and adequately trained, the goal is that given an unknown (or unseen) input (e.g., module block 38 in FIG. 1A), the mapping has enough capacity to produce a correct clear output with a high probability, i.e., an output that is much better than a random guess.

The elemental component of a model is called a neuron, which roughly behaves like a brain neuron. A machine neuron is a function y=h(a) where $a=W^T(x)+b$. The function h(a) is a weakly monotonic (non-decreasing) nonlinearity activation function such as rectified linear unit (RELU), while various other functions, such as an even sin( ) function in the case of continuous implicit signal modeling are also used. The symbols x,y and b designate input, output and bias of the model, respectively, where bias in a statistical term that signifies the deviation from the true mean of an estimator. Function y preferably is performed inside the layers of models represented by module block 70 and module block 76 in FIG. 1A. It is understood that CPU 54 may carry out some or all execution by module blocks 70 and 76.

A learning model can be organized as layers of neurons. The neurons of one layer are connected to the neurons of the next layer with different degrees of connectedness (i.e. from sparsely connected to fully connected) and with different amount of weights. Let the vector $\bar{x}_1$ be the input to the first layer. The output vector $\bar{y}_1$ of layer $i^{th}$ is the input vector for the next layer. The output of the last layer is the output of the network, and only the first input and the last output vectors are visible outside the network. The inner layers of the model are called hidden layers (e.g., module block 74 in FIG. 1B) and are parameterized by the so-called latent variables (e.g., module block 80 in FIG. 1A and module blocks 80-1, 80-2, and 80-3 in FIG. 1B).

The architecture of a model composed of many serial layers is called a deep model. As contrasted to shallow models that typically have a single inner layer, deep models have more learning capacity for complex tasks such as the design goals provided by embodiments of the present invention. Accordingly, FIG. 1B preferably is implemented as a deep model.

The building patterns of input data for most practical applications of deep neural networks are hierarchical, i.e., the input features consist of small building patterns. The composition of these smaller pattern blocks progressively develop into larger features (e.g. phonemes, sub-words, words, sentences and paragraphs). An important class of deep neural networks (DNN) called convolutional neural network (CNN) preferably is organized as a hierarchy of simple convolutional layers followed by progressively more connected to fully connected (or denser) layers. The CNN approach has been used successfully in many applications, including general imaging, medical, finance or any multidimensional data space. Similarly, the convolution-based filtering can be applied in the time axis or in the frequency domain for processing speech signals.

An important class of hierarchical CNN is called autoencoders; an autoencoder essentially copies its input to its output. But in doing so, it learns about the salient or useful features of the input distribution. By expressing the loss function of an autoencoder to minimize the error in mapping its input (instead of to input itself) to another target output distribution, an encoder/decoder network that can be trained to learn to perform a desirable transformation. As applied to the present invention, the input may be a muffled accent in one linguistic region (as heard by a subject user with hearing impairment), and the output target can be a desired articulation of that speech in a form that is clearer to the user.

FIG. 1B further depicts an exemplary encoder/decoder network model used to implement embodiments of system 10, according to embodiments of the present invention. Module block 20 represents the input audio signal, and module block 110 represents the desired output audio that is more intelligible to user 120 than the non-processed input audio signal would be. Referring to FIG. 1B, the encoder/decoder network model has two signal flow paths, starting with module blocks 40-1 and 40-2. Module blocks 40-1 and 40-2 preferably are two log Mel-spectrum representations. Encoder 70-1 preferably includes blocks of convolutional and activation functions shown as module block 74-1. For instance, the first layer may have 128×64×2 dimensions, and the output layer may have 16×8×40 dimensions. Similarly, encoder 70-2 preferably includes at least a series convolutional filter and activation functions shown as module block 74-2. The role of encoder 70-1 is to primarily capture the essence of acoustic features (namely, pitch, rhythm and timbre) of audio 20 (e.g., essentially the voice properties of the human speaker-source of audio in module block 20). The role of encoder 70-2 is to primarily capture the transformation of input audio 20 to a content that is more intelligible to user 120. Module block 75 combines these said features and passes them to decoder module 70-3. The attained goal is to deliver the refined more intelligible output audio, while preferably preserving the identity of the speaker (essentially the way a person's voice sound). Stated differently, the speaker's voice is transferred to user preferred articulation. Lines 72-1 and 72-2 represent skip connections between the corresponding layers of encoders and decoder. The function of skip connections (besides providing computational stability to the system) is to preserve certain vocal and content attributes of the input voice as the transformation of the input signal propagates through the model. Decoder module 70-3 with its convolutional and activation filters 74-3 recreates audio in a representation matching input representation 40-1 and 40-2. Module blocks 80-1, 80-2 and 80-3 are corresponding model parameters and hyper-parameters for model module blocks 70-1, 70-2 and 70-3. For completeness, module block 73 is a reference to a collection of loss and optimization functions for the machine learning model components. The output representation (not shown by a module block) is passed to voice synthesizer module 90-1 to produce output audio 110 that preferably is substantially in the voice of the audio source speaker but it is more intelligible by user 120.

Figure 1C:
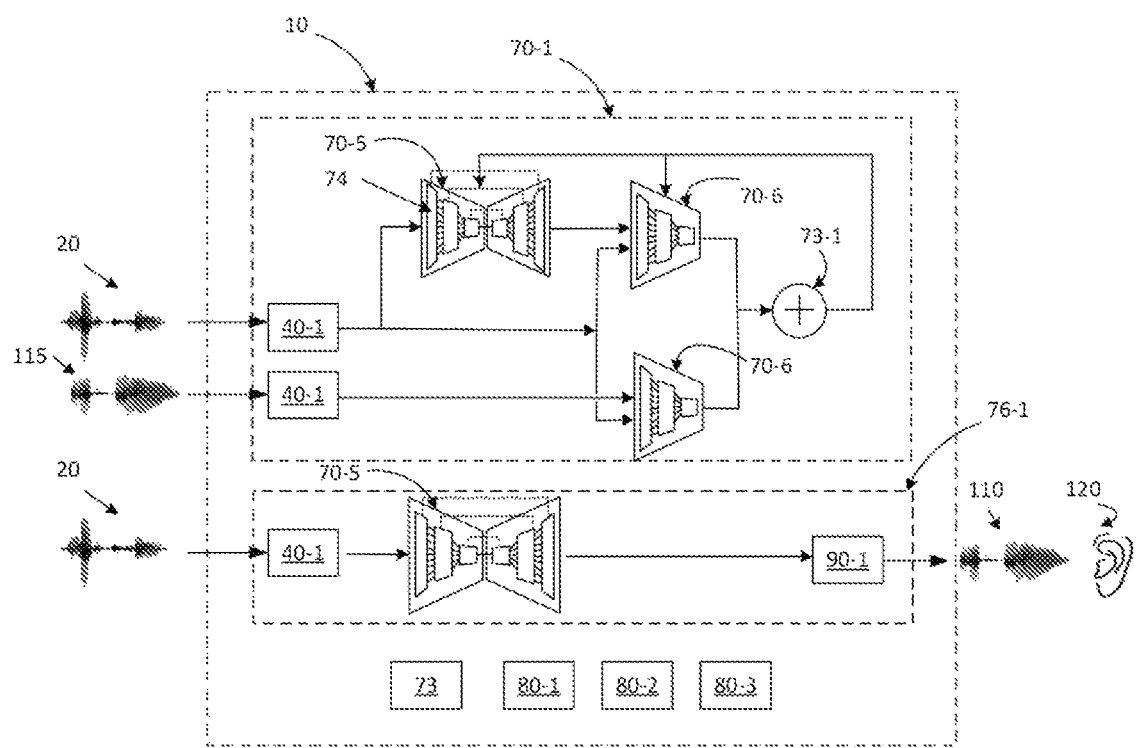
FIG. 1C is a block diagram depicting signal flow in another exemplary machine learning module, according to embodiments of the present invention.

In another embodiment, system 10 in FIG. 1C uses a form of Generative Adversarial Network (GAN) model such as described by Goodfellow at https://papers.nips.cc/paper/5423-generative-adversarial-nets.pdf. In a GAN model, a generative (the generator) module competes against an adversary module (the discriminator). The generator fabricates a sample (e.g., an audio signal) and the discriminator tries to determine if the sample is from the training set distribution (for instance a valid female voice) or a fake sample, by estimating the probability that the sample is from a real training distribution. The generator-discriminator interaction is analogous to a form of a game theory scenario. In this scenario, the generator tries to minimize the discriminator's ability to determine that it has produced a fake sample, and the discriminator tries to maximize its ability to determine that the discriminator has produced a fake sample.

A conditional GAN variation applicable to embodiments of the present invention, is depicted in FIG. 1C. Such variation is described at https://arxiv.org/pdf/1611.07004.pdf. More particularly system 10 preferably includes a training machine learning module 70-1, and an inference module 76-1. Referring to training machine learning module 70-1, module block 70-5 is a generator module, and module blocks 70-6's are two copies of the discriminator module. Module block 20 is the input audio signal, and module block 115 is sample desirable target (or labeled) audio signal that should be heard more intelligibly by user 120 when the model operates in inference mode, module block 70-5. Module block 115 audio represent samples collected during the data collection from the user or derived from a relevant population as described in more detail below. Also see module blocks 32 and 34 in FIG. 1A. Generator module 70-5 preferably is an encoder/decoder module with convolutional and non-linearity layers 74, and skip connections (described with respect to FIG. 1B, but not explicitly called out in FIG. 1C). Discriminator module 70-6 preferably is an encoder module. During training, audio input 20 is fed to generator module 70-5 after undergoing a transformation at module 40-1 to perhaps a log Mel-spectrogram representation. Other representations are of course possible, as was noted with respect to module block 40 in FIG. 1A.

Still referring to FIG. 1C, the output of generator module 70-5 and a copy of the same input are concatenated (i.e., placed side-by-side) and fed to the first copy of discriminator module 70-6A. Meanwhile, the said input and a target audio signal 115, after undergoing a similar transformation (see module 40-1), are concatenated and fed to the second copy of discriminator module 70-6B. Module block 73 (and specifically module block 73-1) in FIG. 1C is the representation of the system 10 loss function formulation. One aspect of the loss function compares how the features produced by modules 70-6A and 70-6B compare with each other. A feature here is an output of an encoder that captures the salient aspects of the input in a compact representation. Additionally, the appearance of target 115 and output of generator 70-5 are compared and included in the system loss function. The goal of Discriminator is to maximize this loss and the goal of generator module 70-6 is to minimize this loss (the direction depends on the formulation of the sign of the function). The training phase is successful when discriminator module 70-6 becomes unable to distinguish between generator module 70-5 output and actual labeled data, e.g., 115.

Still referring to FIG. 1C, module block 76-1 is the inference phase of signal processing system 10. At this phase, only generator module 70-5 is needed to produce an output that is synthesized by module block 90-1 to produce output audio signal 110, which is more intelligible to user 120 than would be unprocessed original audio 20. Module blocks 80-1, 80-2, and 80-2 are corresponding model parameters and hyper-parameters for models 70-5 and 70-6A and 70-6B.

The preferred method of maintaining vocal identity of the speaker of input sound 20 as explained with reference to FIG. 1B can be also be implemented in the embodiment of system 10 described with respect to FIG. 1C. This implementation includes providing two different channels for each of the noted models.

It should be observed that a functional hearing aid solution when used to meet the real-time requirement of human-audio visual systems (e.g., lip syncing) must meet strict timing requirements, perhaps within 10 ms or less. Thus an additional mechanism to be considered in an overall design system 10 (see FIG. 1A, FIG. 1B, FIG. 1C) is a system to monitor latency of speech transformation. A preferred implementation may include a deadline threshold that if reached passes the original input speech 20 through to user 120, without processing, so as to not interfere with the timely flow of a conversation. Such latency control system is further described in FIG. 4C.

As noted, the embodiments and methodology of system 10 described with respect to FIG. 1A transformed an input audio stream 20 of spoken words to an output audio 110 in a form that is more intelligible to hearing impaired user 120. The embodiments and methodology described with respect to FIG. 1B and FIG. 1C provided at least two machine learning preferred embodiments that achieve sufficiently real-time performance with acceptable latency. However, the design goals of system 10 can also be realized using other machine learning transformational models albeit with different timing performance requirements. Such alternative models may include transforming an input audio stream with sentence-based or relaxed timing requirements. At least three exemplary such optional methods of signal processing are described below.

While CNN models behave like a directed graph, and function as feedforward machines, another important category of neural network models called Recurrent Neural Networks (RNN) have feedback nodes. RNN are useful models for processing text and speech input because they maintain a short-lived temporal context of their input. This feature is very useful in understanding text and speech, or perhaps understanding the way a word sounds in the presence of other words. An improved RNN called Long-Short Term Memory (LSTM) can maintain a variable long vs. short term memory of its input to perform more complex text or speech comprehension. The ability to control the term of model memory can be as important as understanding the connotation of a spoken sentence may perhaps require remembering the resolution of the meaning of a previous or a next phrase. Conversely, forgetting the intent of past speech is important to perhaps understanding the true meaning or sound of the present new phrase or word. For example, it may be easier to discern the spoken words "fifteen nights" vs. "fifty nights" by emphasizing the letter sound 'n' in the spoken word "fifteen". Conversely, the spoken word "teen" in "teenager" can be reconstructed by the listener's brain even if 'n' is not emphasized.

In one embodiment of the present invention, a variant of sequence-to-sequence model with an encoder/decoder architecture having a stack of recurrent LSTM nodes is used. Unlike the typical application of sequence-to-sequence models for tasks such as language translation, the depth of the recurrent nodes or effectively the size of the maintained input context sequence is short. The purpose of the model is to map a unit from the input domain (e.g., a speaker's voice) to a unit in an output domain that is specifically trained for better hearing of a user or listener. i.e., listener 120. In the encoder/decoder architecture, the input sequence creates a latent state context, essentially a state of model's latent weights. Using the encoder state context and an initial output sample, the decoder appends the most likely next output sample based on the last output; and the process repeats. The parameter state of decoder is learned during the training. During the inference, the decoder recreates the decoder state for an input from the same training domain (not necessarily from the same training set), and the decoder confidently produces the output based on the guidance it has received during the training.

In yet another embodiment, a reinforcement learning model is used. In a typical supervised learning solution, the decision of the model to predict the truth (in this case a clear speech segment) is rewarded by a success score. However, the success that represents a good clearly intelligible speech may not be the best clear speech for the listener. In reinforcement learning, the model is allowed to explore other possibilities and is rewarded perhaps with a higher score if a better prediction is made. The exploration may not always produce a better solution, but even such an outcome provides a better understanding of the problem domain. In the present invention, what is sought is an especially good way to transform any input speech to a form that is clearest and most intelligible to the listener's audio processing pipeline.

As exemplified by the embodiments of FIG. 1A, FIG. 1B, and FIG. 1C, choice of the representation of input/output sound signal for the purpose of internal processing and maintaining vocal audio information is advantageously provided. The sound data in its raw form is a continuous one-dimensional time series that can be digitized at a sampling rate that theoretically must be at least twice the highest frequency present in the input stream, to preserve the highest frequency content of the signal. Several data representations are applicable as model input/output data formats, according to embodiments of the present invention.

Linear pulse-code modulation (LPCM) is a digitized representation of an analog audio signal. The sampling rate and depth (number of bits) of each recording sample govern the fidelity of this representation with respect to the original input sound. The .WAV format is a typical example of industry formatting. Optional use of LPCM in embodiments of the present invention is depicted in FIG. 1A by elements of module block 40.

Figure 2:
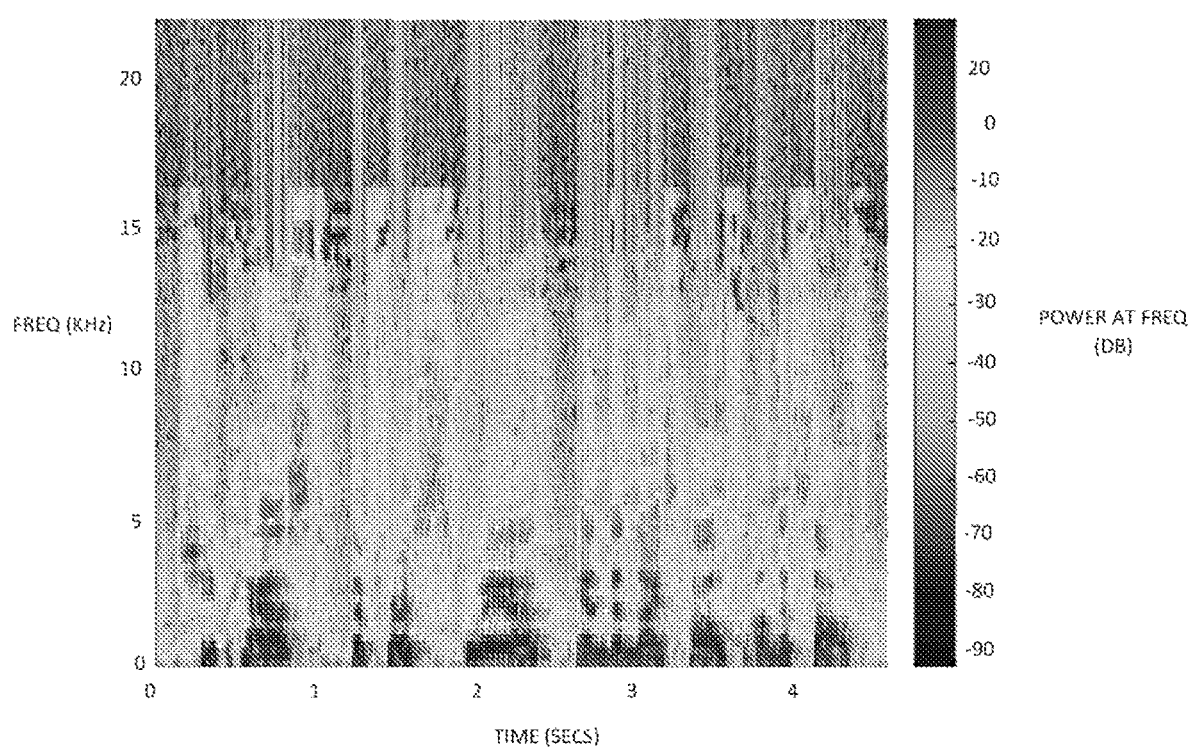
FIG. 2 depicts an exemplary frequency-time-power spectrogram, as may be used by embodiments of the present invention.

For sound modeling purposes, it is desirable to represent sound as a sequence of discrete representations. This is accomplished by converting the signal from the time domain to the well-studied frequency domain using Fast Fourier Transform (FFT). The result is represented in a form of power spectrum that gives power at each frequency bin. In order to preserve the changes in the frequency content of a voice wave form, the signal is divided into short slices (e.g., 15 ms sub-intervals). The FFT of each slice is computed, and concatenated to produce a short-term FFT or power spectrogram of partitions of the original audio signal is produced. FIG. 2 depicts a sample log power spectrum of about 4.5 seconds of an audio signal. The x-axis is time and the y-axis is power at frequency in DB. The lighter cells represents higher power. Such a representation is like an x-y image frame that can be a unit of processing for machine learning algorithms in the embodiments of the present invention. In order to recover audio from the power spectrum, an inverse FFT is used for each sub-intervals to reconstruct the original or transformed audio. A preferred inversion algorithm is called Griffin-Lim Algorithm (GLA) and is module block 90 of FIG. 1A. Further detail on GLA may be found at D. Griffin and J. Lim, "Signal Estimation from Modified Short-time Fourier Transform," Acoustics, Speech and Signal Processing, IEEE Transactions on, vol. 32, no. 2, pp. 236-243, 1984.

A preferred representation that better captures the human auditory system is the Mel-spectrogram, which is derived from Mel-frequency encoding. Mel-frequency is motivated by the observation that human perception of frequency content of speech does not follow a linear scale. Thus, for each audible tone with an actual frequency f measured in Hz, a subjective pitch is measured on a scale called the "Mel" scale. The Mel-frequency scale has linear frequency spacing below 1000 Hz, and has logarithmic frequency spacing above 1000 Hz. As a reference point, the pitch of a 1 KHz tone 40 dB above the perceptual hearing threshold is defined as 1000 Mels. A commonly used approximation to compute the Mels for a given frequency f in Hz. is given by equation (2), below:

$$mel(f) = 2595 * \log 10 \left(1 + \frac{f}{700}\right). \tag{2}$$

The use of preferably log Mel-spectrogram is referenced as module block 40 in FIG. 1A. Other representations of audio signal include Mel Frequency Cepstral coefficients (MFCCs). MFCCs are cosine transforms of the real logarithm of the short-term energy spectrum expressed on a Mel-frequency scale or Mel-spectrogram as called out in module block 40 in FIG. 1A.

Figures 3A, 3B, 3C, 3D:
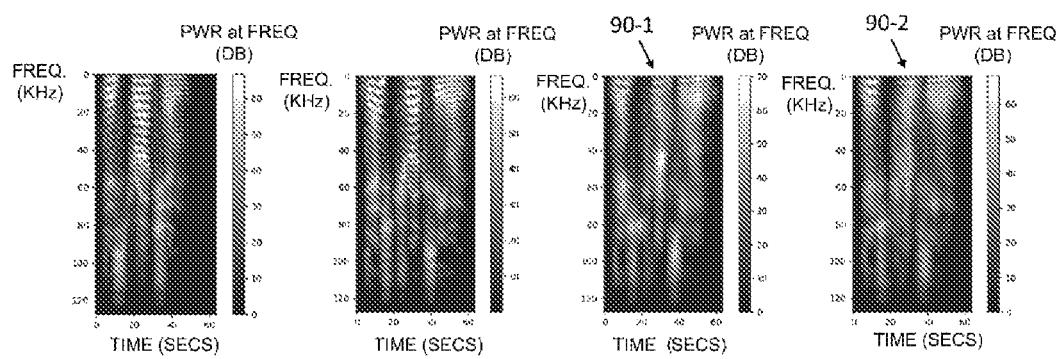
FIG. 3A depicts a Mel-spectrogram representation of an exemplary utterance of an input word, as used by embodiments of the present invention.
FIG. 3B depicts a Mel-spectrogram representation of the same word as FIG. 3A as a preferred utterance by a user, according to embodiments of the present invention.
FIG. 3C depicts a first predicted Mel-spectrogram representation, as produced by embodiments of the present invention.
FIG. 3D depicts a second predicted Mel-spectrogram representation, as produced by embodiments of the present invention.

FIGS. 3A-3D depict a series of transformation of speech using exemplary machine learning encoder/decoder model in system 10 in FIG. 1B. FIG. 3A is a log Mel-spectrogram representation of the utterance of the single word "destruction" as input sound 20 to the model. FIG. 3B is a log Mel-spectrogram representation of the same word as preferred by a target user (listener 120) having impaired hearing, and in need of the present invention. If the sound represented by FIG. 3B were heard by a person with normal hearing, the latter denunciation would sound like "tion" is replaced with a strong stretched "s . . . sn" sound. Thus, FIG. 3B represents the target outcome (or label, see FIG. 4B, module block 320) that the model should predict after a period of training. Thus, what is shown in FIG. 3B is used to evaluate the prediction success of the model. FIG. 3C and FIG. 3D are predictions of at least two variants of the model (i.e. an exemplary output of module block 70-3 in FIG. 1B in the Inference phase, or an exemplary output of model module block 70-5 in FIG. 1C). The different models are essentially variations in parameters θ and ω in equation (1). FIG. 3D shows a slightly different prediction outcome with speech nuance module block 90-2 as compared to the speech nuance module block 90-1 in FIG. 3C.

Data collection and training preparations according to embodiments of the present invention will now be described. In the prior art, a hearing impaired listener undergoes an audiogram session in which the listener responds to input signals having different frequencies. By contrast, according to embodiments of the present invention, the listener undergoes a training session and responds to clarity or intelligibility of input speech sounds. As such, hearing aid system 10 learns not only the particulars of the sensorineural aspects of the listener's hearing, but also learns the listener's entire hearing pipeline, which also includes the brain's auditory processing and interpretation.

Not found in relevant hearing aid prior art is the application of a DNN that is trainable by a specific hearing aid user, and preferably trainable by the sounds and conversations that dominate the surroundings of this user. Therefore, some aspects of the conversational environment may be factored in during the training. For example it is highly desirable that the training render more intelligible speech from the user's spouse than speech from a random person.

Various model training procedures used in embodiments of the present invention will now be described, wherein the model transforms a unit or units of input speech into a unit or units of output speech. The transformation mapping can be general and encompass typical one-to-many, many-to-one, or many-to-many forms. The input is a unit of speech that articulated by a speaker (or speakers), and the output is the form of clearer, more intelligible speech that is comprehensible to the listener. As noted, without loss of generality, the listener typically has a hearing impairment, or has difficulty understanding a particular dialect of a language, pronunciation of words, or accents.

Let the following two exemplary roles be defined for ease of understanding the description of preferred fitting embodiments of the present invention. Assume Mary has difficulty fully hearing and understanding speech by Paul. Perhaps Mary hears certain words but cannot discern all the spoken words. If Paul is Mary's spouse, family member, or close friend, this hearing deficiency can be especially challenging and frustrating. In this example, a training goal is to collect data information from both Mary and Paul, to create a training dataset for a model that shifts Paul's speech to a vocal signal that Mary can understand more clearly, preferably without overly altering the way Paul sounds. Such model and signal processing transformation preferably can be embedded in a hearing aid device that Mary can wear, or can be built into (or embedded in) a speaker system, a smart speaker, a smart headset, earbuds, a mobile device, a virtual assistant, etc. In FIG. 1A, hearing aid system 10 preferably includes such processing system as the learning module block 80 of FIG. 1C.

Acquiring data from Paul may be accomplished by Paul's logging into an internet web session, or perhaps a computer or a mobile device application. Of course Paul could instead visit a hearing clinic whereat Paul's speech data can be acquired. However the data is acquired, Paul will be instructed to repeat, in his normal way, a preferably short sentence. Paul will also be instructed to repeat the sentence with some varied utterances perhaps emphasizing 'l' and 'r' sounds in 'letter' or 's' sound in 'this'. The sentence text, with some annotations, may be displayed for Paul to read, or perhaps it is heard clearly by Paul, perhaps via a high quality headset, and then repeated aloud by Paul into a high quality microphone. Understandably the text or audible instruction is in a language understandable to Paul. Paul's voice enunciating the text is recorded and an association between the sentence and Paul's annunciation of the sentence is stored in a database. This data acquisition process preferably is repeated using difference sentences. Preferably the words in the sentences are chosen so that during the total session a majority of perhaps phonemes in the language are articulated by Paul in different language contexts. An exemplary session may take approximately 10-30 minutes, during which time hundreds of voice pairs are acquired and stored.

Similarly, Mary participates in a training session, which of course may be at a different time and different location. Mary may be prompted to choose from multiple Paul's enunciations and indicate which one is clearer. In a more general approach, Mary listens to a preferably trained voice enunciating the same words or sentences and select the clearest one. The volume of audio playback should be set at the minimum hearing level ability of Mary so the choices are not overly influenced by the power of the audio signal.

To ensure Mary selected the correct meaning of the word(s) she hears during the training session, after her final choice, a textual representation of the word (or sentence) may be displayed for Mary to confirm.

In Mary's session, using a trained voice method, the voice provides a few alternative ways to sound the training words or sentences. For instance, the word "this" may be enunciated with different emphasis on the "s", such that the word may sound like "this" or "thiss" or "diss", or "thiiss", as heard by a person with a normal hearing, etc. (One does not know how this enunciation actually sounds to Mary, only that Mary seems to best understand the word "this" when it is enunciated with a different than normal pattern.) Mary provides a feedback as to which form of the word she finds clearest or most intelligible to understand. The procedure is somewhat analogous to an optometrist trying different lenses for a patient needing prescription glasses, with the goal of finding the best prescriptions for the patient's vision.

The trained voice may also be produced by a generative text-to-speech (TTS) algorithm that produces different ways of articulating the textual source words or sentences. The text can be annotated using meta characters (or escape characters) to perhaps change the pace of a syllable, put emphasis on a syllable (like emphasize 'n' in 'thirteen'), color a word by adding a vowel (like pronouncing 'special' as 'especial') add small delay between certain syllables (and compensating it by speeding up other syllables), extend an abbreviated word (like change 'can't' to 'cannot'), or even use clues from a second familiar language to the user to the enunciation of some of her first language words, etc.

Figure 4A:
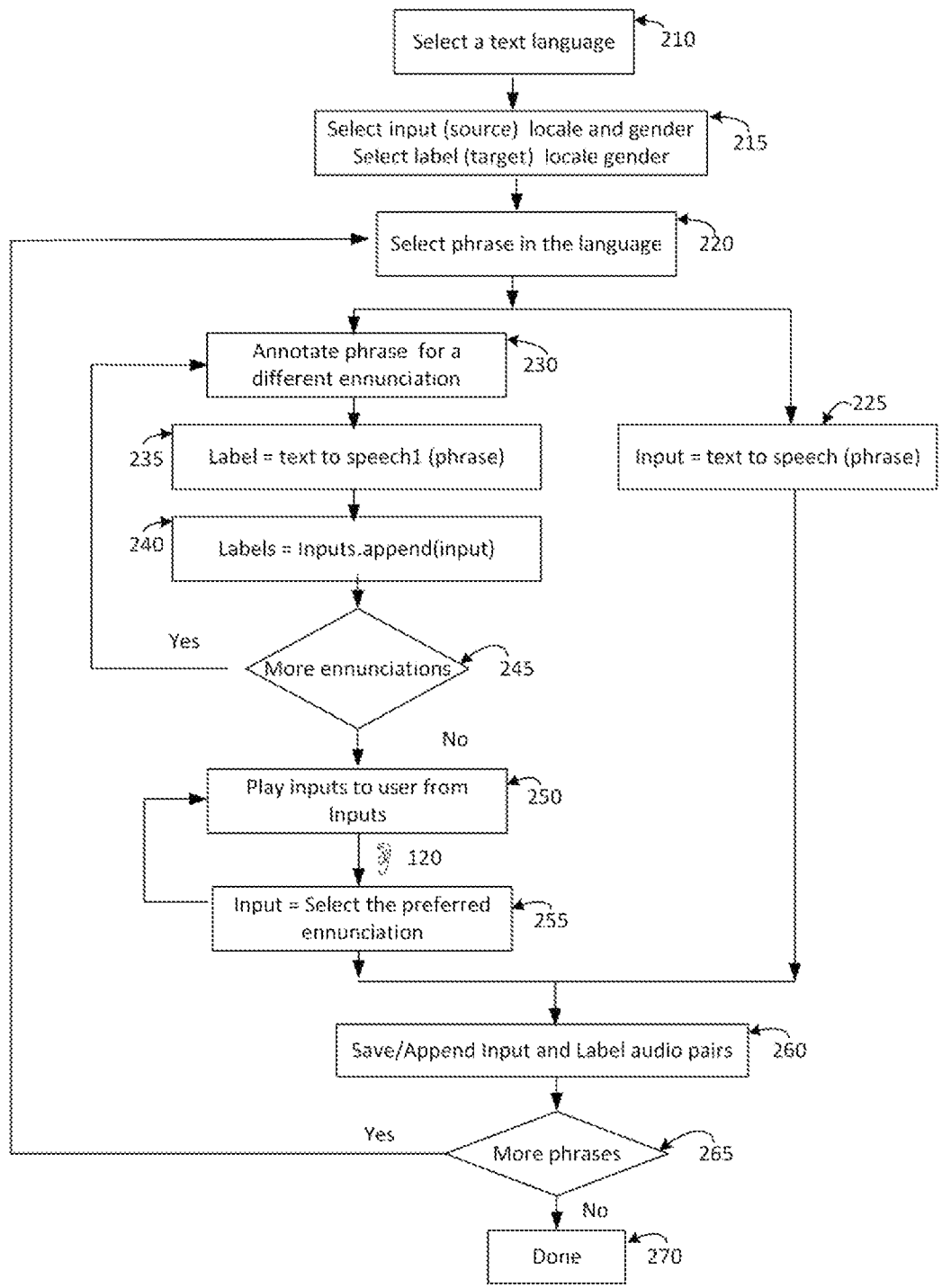
FIG. 4A depicts a flow diagram of a data collection procedure, according to embodiments of the present invention.

FIG. 4A depicts an exemplary training data collection session using TTS technology; see also module blocks 60 and 64 in FIG. 1A. In FIG. 4A, the session begins by selecting a language commensurate with the language of the user (method step 210). In this case, the term user refers to the person with hearing impairment from whom the session collects a set of custom training data (see module block 34 in FIG. 1A). In FIG. 4A, method step 215, selects the locale and gender of the first speaker's voice, and the locale and gender of the second target preferred speaker voice. The data from the second speaker is used to collect the training label data in a more intelligible vocal form preferred by the user. Method step 220 selects a phrase from the language, for instance "fifteen phone names." Method step 225 converts the phrase to speech in the first voice distribution. This is a sample from the first speech distribution that the user may have difficulty to hear clearly. Method step 230 annotates the text of the phrase is different enunciation perhaps by emphasizing a syllable or stretching sound of a letter. Method step 235 transforms the text to speech. Method step 240 appends this enunciation to the dataset of various enunciations for the said phrase. Looping back from method step 245 to method step 230 occurs until a good set of plausible enunciations is produced. It should be noted that this process can be done in an offline manner and the dataset be ready for use in method step 250 going forward. When sufficient enunciations of the phrase is prepared, method step 250 plays each enunciation to user (or listener) 120.

Preferably, the volume of audio playback should be set at the minimum hearing level ability of the user so the choices are not overly influenced by the power of the audio signal. Looping from method step 255 back to method step 250, the interactive session collects information by getting feedback from the user as to which enunciation is best intelligible for the user. The preferred enunciation is the label (ground truth target) for the selected phrase. Method step 260 saves the pair consisting of input voice from method step 225 and the voice from method step 255 is labeled to create an entry in the training dataset (see block 30 in FIG. 1A). Method step 265 loops back to collect more training entries with different phrases until sufficient entries (perhaps hundreds to thousands) are collected for a custom training dataset in method step 270 (see also module block 34 in FIG. 1A). In a preferred embodiment the software algorithm implementing the method steps described with respect to FIG. 4A may be routine 60 and 64 in FIG. 1A, and stored in a portion of memory 56 for execution by CPU 54 in processor unit 50, depicted in FIG. 1A.

Returning to the Mary-Paul sessions, although the pitch and tone of the trained voice need not be exactly the same as Paul's voice, preferably the pitch and tone of the trained voice is selected from a small population of available voices closest to Paul. For instance, if Paul voice has a low pitch (as in a male voice), the trained voice should be selected from a low pitch male voice, and so forth. Alternatively, in another embodiment of the present invention, a machine learning model may be used that performs a generic transformation on the content (or transcription) of the voice, and then add the pitch and timbre (or acoustic content) to the reconstruction stage of the output voice similar to the function of block 70-2 in FIG. 1B.

Additionally, if a hearing audiogram of Mary's ears is available, the trained voice can use it to put more emphasis on the letter sounds that reflect the frequency response of her ears. For instance, if the patient has hearing losses in high frequencies (a typical case for older people) in her left ear, the trained voice will emphasize the primary consonants such as letters 's', 't', 'k' and 'f' sounds for auditory input to her left ear. For the losses of the low frequency (rather rare), the emphasis will be on the 'i', 'j', 'm', etc. sounds. In the middle frequencies, the emphasis will be on the 'o', 'sh', 'p' etc. sounds. Of course obtaining a database for different languages may involve use of different sounds than suggested for the English language. However the methodology of the embodiments of the present invention have applicability to improving hearing in other languages.

In the above Mary-Paul examples, the custom data can be anonymized (i.e. user identity removed) and aggregated with data collected from a growing number of users to create categorical population datasets (module block 32 in FIG. 1A) categorized as having similar internal hearing processing impairment and linguistic backgrounds. During the training, the custom dataset (module 34 FIG. 1A) is optionally augmented by a population dataset to create a sufficiently large training dataset for the model training (module 70 in FIG. 1A) for a typical user Mary.

Figure 4B:
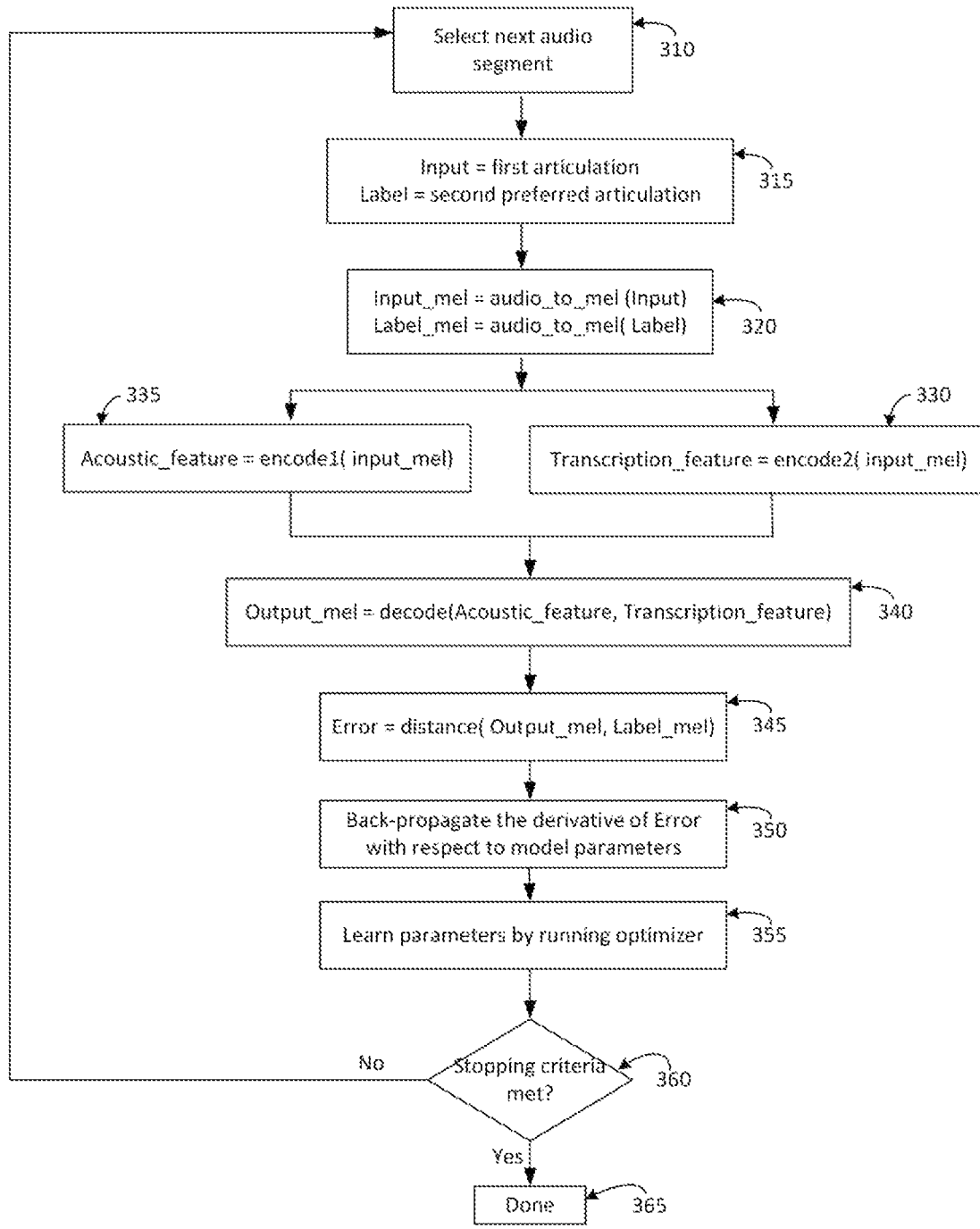
FIG. 4B depicts a flow diagram of an exemplary training procedure, according to embodiments of the present invention.

FIG. 4B depicts the repetitive steps of an exemplary training process to learn the parameters of the underlying machine learning model (module block 70 in FIG. 1A). Still referring to FIG. 4B, method step 310 selects the next pair of audio segments from the training dataset. Method step 315 assigns the first segment articulation in the audio pair to Input and assigns the second preferred segment articulation in the pair to Label. Presumably, Label is the preferred enunciation by the user. Method step 320 produces log Mel-spectrogram of Input and Label. The log Mel-spectrogram of Input is broadcast to the first encoder in module block 335 and the second encoder in module block 330. These method blocks may correspond to blocks 70-1 and 70-2 in FIG. 1B. The first encoder preferably specializes in capturing the acoustic feature of Input, and the second encoder preferably specializes in capturing transcription (or content) feature of Input. Method step 340 concatenates the acoustic and transcription features and submits them to the decoder module to obtain an Output, also in Mel-spectrogram representation. Method step 345 evaluates an error function to determine how far Output is from the desirable Label. The notion of far is defined as a distance metrics (including but not necessarily the Euclidean distance) in the multi-dimensional feature space. Method step 350 backpropagates the derivative of the error with respect to the model parameters. Method step 355 embodies the process of the parameter (or weight) adjustments (learning) by running a preferred optimizer (see also module block 73 in FIG. 1A). Still referring to FIG. 4B, method step 360 evaluates the stopping criteria of the learning process and loops back to continue learning. The stopping decision is usually made by testing the model with a validation dataset to prevent over or under-fitting. Finally method step 365 ends the training and the learned model parameters are saved to be used in the inference phase (block 76 in FIG. 1A). In a preferred embodiment the software algorithm implementing the method steps described with respect to FIG. 4B may be routine or data (blocks 70 or 80 in FIG. 1A, respectively) stored in a portion of memory 56 for execution by CPU 54 in processor unit 50, depicted in FIG. 1A. Communication block 52 in FIG. 1A may be used to update the model parameters as it become necessary due to changes in user's hearing impairment.

Figure 4C:
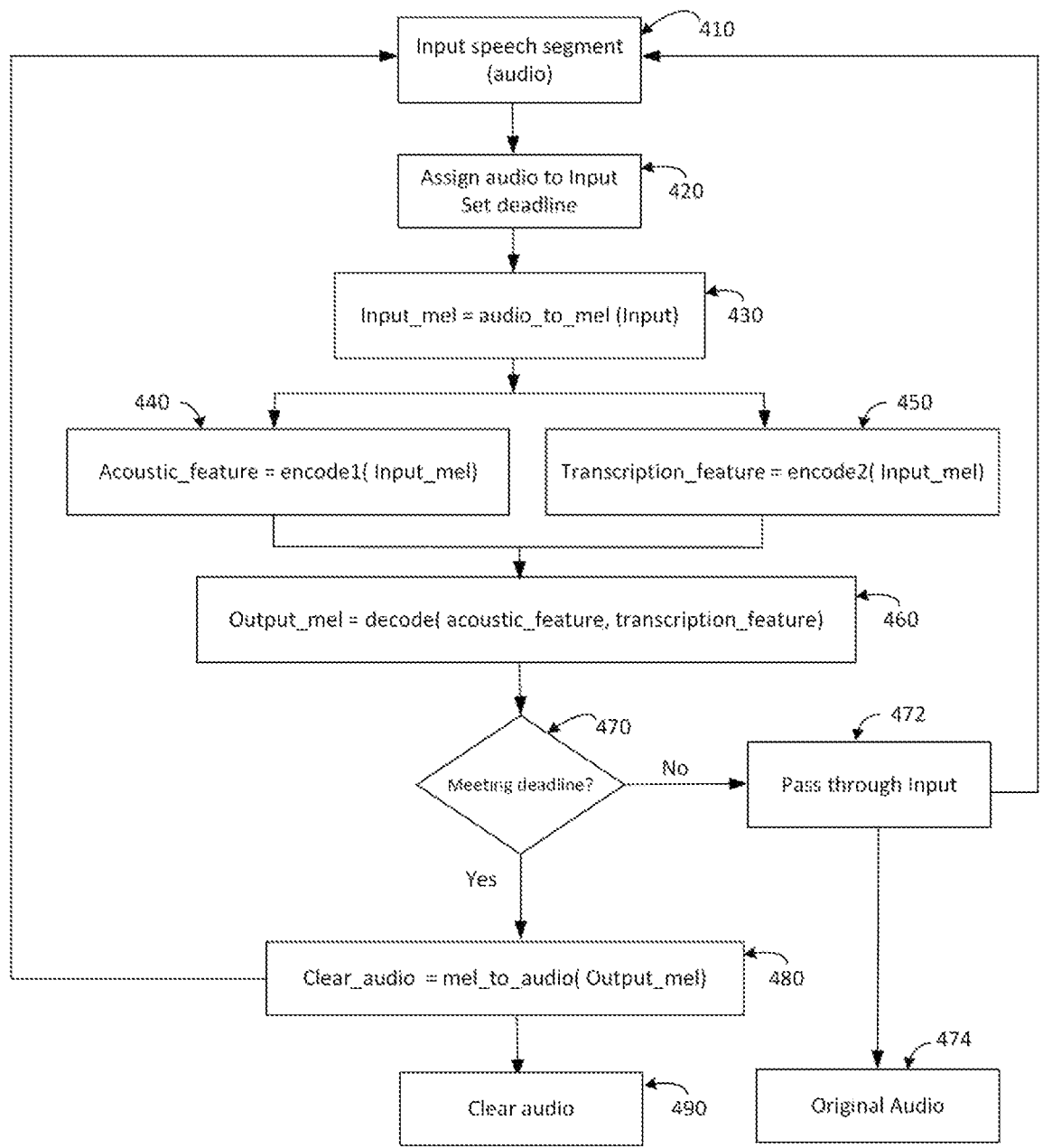
FIG. 4C depicts a flow diagram of an exemplary inference procedure, according to embodiments of the present invention

FIG. 4C depicts the repetitive steps of an exemplary inference (i.e., run-time) phase of transforming input speech to a preferred clearer speech using the underlying machine-learned model. These steps may represent an exemplary function of module 76 in FIG. 1A. Still referring to FIG. 4C, method step 410 captures the next segment of speech. Method step 420 assigns the segment to Input and optionally sets a deadline to complete the remaining processing to produce a clear audio. Method step 430 evaluates the log Mel-spectrogram of Input. This is the similar representation used during the training; see also module block 40 in FIG. 1A. Still referring to FIG. 4C, method step 440 uses the first encoder to extract the acoustic feature of Input. Method step 450 uses the second encoder to extract the transcription (content) feature of Input. Method step 460 concatenates the acoustic and transcription features and submits them to the decoder method step 480 (equivalent to module block 90 in FIG. 1A) to obtain an Output, also in Mel-spectrogram representation. Still referring to FIG. 4C, at module block 470, an optional check can be performed against the deadline set in module block 420. If the deadline is tight, in module block 472, the original Input is passed through and played in module block 474. Otherwise, method step 480 performs an inverse conversion to produce a transformed audio signal (also module block 90 in FIG. 1A). Method step 490 plays the clear output audio that is intended to be more intelligible to the user. In a preferred embodiment the software algorithm implementing the method steps described with respect to FIG. 4C may be routine 76 stored in a portion of memory 56 for execution by CPU 54 in processor unit 50, depicted in FIG. 1A.

Although embodiments of the present invention have been described with respect to designing and implementing an improved hearing aid, it is understood that embodiments may instead be embedded in another host device, including without limitation a telephone, earphone(s), a multi-purpose host device such as a smartphone. In such application, an embedded system according to embodiments of the present invention enhances audio signals "heard" by such device(s) and output for hearing by a user of the device, often a hearing impaired user.

It will be appreciated that embodiments of the present invention can have utility in other applications that provide services through voice interfaces for both users with normal hearing (di minimis impairment) or with hearing impairment. For instance, assume a customer support center with local staff from a first linguistic region provides service to users with hearing impairment having a preferred second linguistic preference. The method of system 10 (FIG. 1A) can be used to transform the dialogs from the first to the second or from the second the first regional speeches. If the spoken language of the first linguistic region is different from the second target language, the transformation may take place in at least two steps. In the first step a prior art translation tool may be used to translate the speech from the first language to a perhaps canonical enunciation in the second language. In the second step, the method of system 10 (FIG. 1A) may be used to transform the speech from the said canonical form in the second language to a second enunciation in the second language preferred by a user with hearing impairment. Clearly, the steps may be reversed to communicate from the user's enunciation (which may be different from the user's preferred enunciation for listening speech) to the first language.

Modifications and variations may be made to the disclosed embodiments without departing from the subject and spirit of the invention as defined by the following claims.

What is claimed is:

1. A method to process an input speech signal having a first speech articulation distribution, and to generate therefrom for a hearing impaired listener an enhanced intelligibility output speech signal from a second speech articulation distribution, the method including the following steps:
   (a) creating input samples from said first speech articulation distribution, and for each input sample presenting alternative articulations to said hearing impaired listener during an interactive session;
   (b) during said interactive session, enabling said hearing impaired listener to hear, at a sound level appropriate to said hearing impaired listener, said alternative articulations for each said input sample;
   (c) selecting for each said input sample at least a sample from said alternative articulations that includes an enhanced intelligibility sound preferred by said hearing impaired listener, whereby a plurality of preferred articulations is created;
   (d) designating said plurality of preferred articulations created at step (c) as second speech articulation distribution data for said hearing impaired listener;
   (e) creating a labeled dataset of corresponding pairs from said first speech articulation distribution and said second speech articulation distribution, said labeled dataset representing at least one learnable articulation pattern;
   (f) training a speech articulation transformation model from said labeled dataset created at step (e) such that when trained, said model in response to an input from said first speech articulation distribution transforms at least one feature of said input from said first speech articulation distribution to generate in real time an enhanced intelligibility output from said second articulation distribution, said speech articulation transformation model selected from a group consisting of (i) neural networks, (ii) convolutional neural networks (CNN), (iii) generative adversarial networks (GAN), and (iv) encoder/decoder networks;
   whereby in real time said hearing impaired listener can hear a more intelligible version of said input speech signal than if said method was not used.

2. The method of claim 1, wherein said enhanced intelligibility output speech signal enhances preservation of vocal identity of said input speech signal.

3. The method of claim 1, wherein said input speech signal is in a first language, and said enhanced intelligibility output speech signal is in a second language.

4. The method of claim 1, wherein step (a) includes using a trained human voice to speak and create at least some of said alternative articulations.

5. The method of claim 1, wherein at least a portion of step (a) is carried out using an algorithm selected from a group consisting of (i) text-to-speech and (ii) speech-to-speech.

6. The method of claim 1, wherein said hearing impaired listener has a magnitude of hearing impairment that is de minimis.

7. The method of claim 1, wherein step (f) includes using speech data collected from said hearing impaired listener and using speech data collected from a demographically related population.

8. The method of claim 7, wherein said related demographically related population has at least one characteristic selected from a group consisting of (i) age of said hearing impaired listener, (ii) sex of said hearing impaired listener, (iii) linguistic background of said hearing impaired listener, (iv) spoken accent of said hearing impaired listener, and (v) prevailing linguistic accent spoken by people in a geographic region of said hearing impaired person.

9. The method of claim 1, wherein at step (f) a neural network is formed, said neural network selected from a group consisting of (i) a recurrent neural network (RNN), and (ii) a long-short term memory (LSTM) network.

10. A hearing aid system to process an input speech signal having a first speech articulation distribution, and to generate therefrom for a hearing impaired listener an enhanced intelligibility output speech signal from a second speech articulation distribution, the hearing aid system including:
   a processor system having at least a CPU, memory, and at least one software routine stored in said memory and executable by said CPU to carry out processing of said input speech signal to produce said enhanced intelligibility output speech signal;
   a first software routine, stored in said memory and executable by said CPU to create input samples from said first speech articulation distribution, and for each input sample presenting alternative articulations to said hearing impaired listener during an interactive session;
   a second software routine, stored in said memory and executable by said CPU to enable said hearing impaired listener to hear during said interactive session, at a sound level appropriate to said hearing impaired listener, said alternative articulations for each said input sample;
   a third software routine, stored in said memory and executable by said CPU to select for each said input sample at least a sample from said alternative articulations that includes an enhanced intelligibility sound preferred by said hearing impaired listener, whereby a plurality of preferred articulations is created;
   a fourth software routine, stored in said memory and executable by said CPU to designate said plurality of said preferred articulations as second speech articulation distribution data;
   a fifth software routine, stored in said memory and executable by said CPU to create a labeled dataset of corresponding pairs from said first speech articulation distribution and said second speech articulation distribution, said labeled dataset representing at least one learnable articulation pattern;
   a sixth software routine that is a deep learning model selected from a group consisting of (i) a neural networks, (ii) convolutional neural networks (CNN), (iii) generative adversarial networks (GAN) model, (iv) and encoder/decoder network model, stored in said memory and executable by said CPU to form and to train a speech articulation transformation model from said labeled dataset created by said fifth software routine such that when trained, said model in response to an input from said first speech articulation distribution transforms at least one feature of said input from said first speech articulation distribution to generate in real time an enhanced intelligibility output from said second articulation distribution, whereby in said real time said hearing impaired listener can hear a more intelligible version of said input speech signal than if said hearing aid system was not used.

11. The system of claim 10, wherein said enhanced intelligibility output speech signal enhances preservation of vocal identity of said input speech signal.

12. The system of claim 10, wherein said input speech signal is in a first language, and said enhanced intelligibility output speech signal is in a second language.

13. The system of claim 10, wherein said first software routine is carried out using a trained human voice to speak and create at least some of said alternative articulations.

14. The system of claim 10, wherein said first software routine includes an algorithm selected from a group consisting of (i) text-to-speech and (ii) speech-to-speech.

15. The system of claim 10, wherein said system is an embeddable system.

16. The system of claim 10, wherein said sixth software routine uses speech data collected from said hearing impaired listener and uses speech data collected from a demographically related population.

17. The system of claim 16, wherein said related demographically related population has at least one characteristic selected from a group consisting of (i) age of said hearing impaired listener, (ii) sex of said hearing impaired listener, (iii) linguistic background of said hearing impaired listener, (iv) spoken accent of said hearing impaired listener, and (v) prevailing linguistic accent spoken by people in a geographic region of said hearing impaired person.

18. The system of claim 10, wherein said sixth software routine forms a neural network, said neural network selected from a group consisting of (i) a recurrent neural network (RNN), and (ii) a long-short term memory (LSTM) network.

19. A method to process an input speech signal having a first speech articulation distribution, and to generate therefrom for a hearing impaired listener an enhanced intelligibility output speech signal from a second speech articulation distribution, the method including the following steps:

(a) creating input samples from said first speech articulation distribution, and for each input sample presenting alternative articulations to said hearing impaired listener during an interactive session;

(b) during said interactive session, enabling said hearing impaired listener to hear, at a sound level appropriate to said hearing impaired listener, said alternative articulations for each said input sample;

(c) selecting for each said input sample at least a sample from said alternative articulations that includes an enhanced intelligibility sound preferred by said hearing impaired listener, whereby a plurality of preferred articulations is created;

(d) designating said plurality of preferred articulations created at step (c) as second speech articulation distribution data for said hearing impaired listener;

(e) creating a labeled dataset of corresponding pairs from said first speech articulation distribution and said second speech articulation distribution, said labeled dataset representing at least one learnable articulation pattern;

(f) training a speech articulation transformation model from said labeled dataset created at step (e) such that when trained, said model in response to an input from said first speech articulation distribution generates in real time an enhanced intelligibility output from said second articulation distribution, step (f) including using speech data collected from said hearing impaired listener and using speech data collected from a demographically related population having at least one characteristic selected from a group consisting of (i) age of said hearing impaired listener, (ii) sex of said hearing impaired listener, (iii) linguistic background of said hearing impaired listener, (iv) spoken accent of said hearing impaired listener, and (v) prevailing linguistic accent spoken by people in a geographic region of said hearing impaired person;

whereby in real time said hearing impaired listener can hear a more intelligible version of said input speech signal than if said method was not used.

20. The method of claim 19, wherein said enhanced intelligibility output speech signal enhances preservation of vocal identity of said input speech signal.

21. The method of claim 19, wherein said input speech signal is in a first language, and said enhanced intelligibility output speech signal is in a second language.

22. The method of claim 19, wherein step (a) includes using a trained human voice to speak and create at least some of said alternative articulations.

23. The method of claim 19, wherein at least a portion of step (a) is carried out using an algorithm selected from a group consisting of (i) text-to-speech and (ii) speech-to-speech.

24. The method of claim 19, wherein said hearing impaired listener has a magnitude of hearing impairment that is de minimis.

25. The method of claim 19, wherein at step (f) a deep learning model is formed, said deep learning model selected from a group consisting of (i) neural networks, (ii) convolutional neural networks (CNN), (iii) a generative adversarial networks (GAN) model, (iv) encoder/decoder networks, (v) a recurrent neural network (RNN), and (vi) a long-short term memory (LSTM) network.

* * * * *